UNITED STATES PATENT OFFICE.

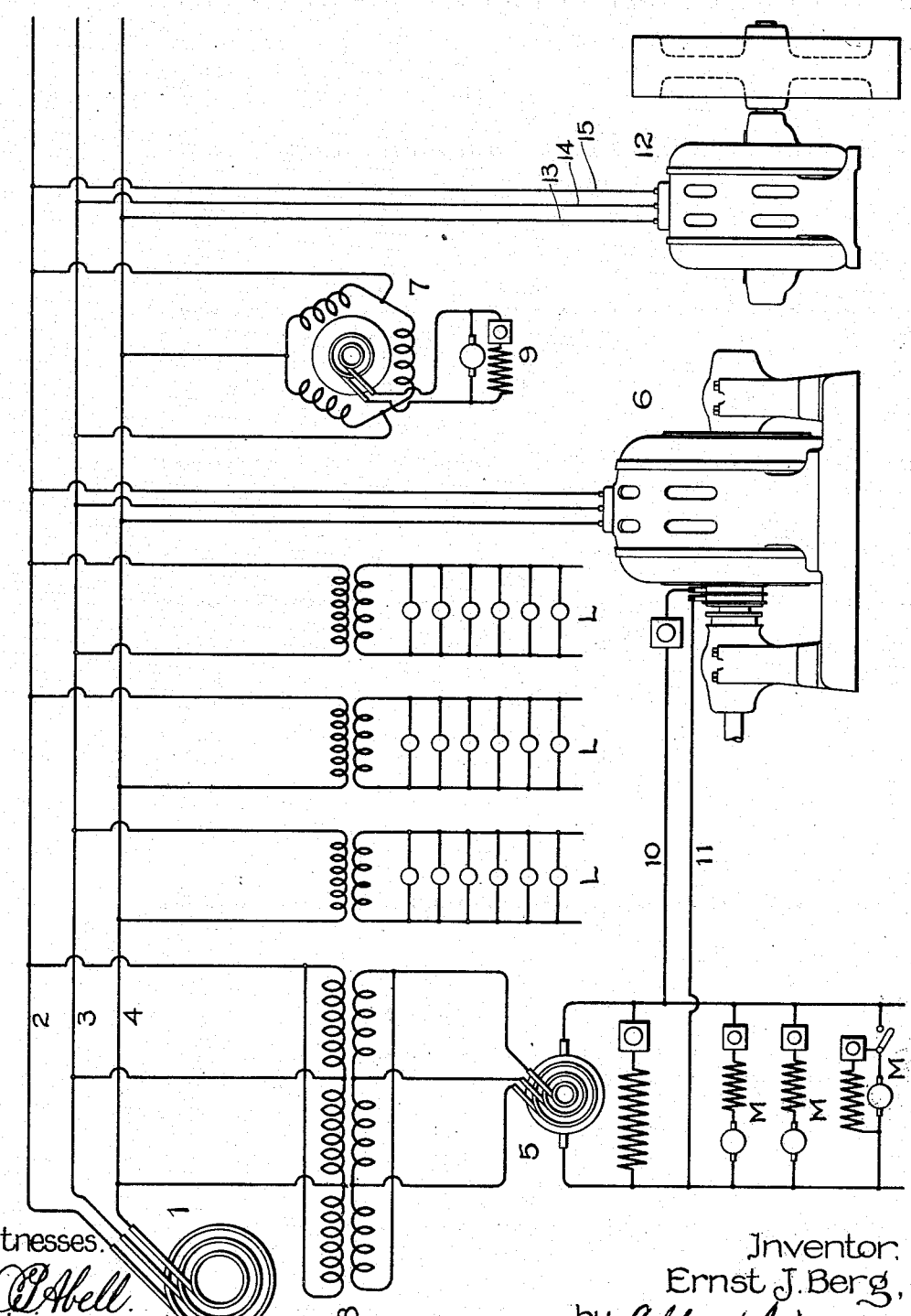

ERNST J. BERG, OF SCHENECTADY, NEW YORK, ASSIGNOR TO GENERAL ELECTRIC COMPANY, OF NEW YORK.

SYSTEM OF ELECTRICAL DISTRIBUTION.

SPECIFICATION forming part of Letters Patent No. 676,300, dated June 11, 1901.

Application filed March 9, 1900. Serial No. 8,012. (No model.)

*To all whom it may concern:*

Be it known that I, ERNST J. BERG, a citizen of the United States, residing at Schenectady, in the county of Schenectady and State of New York, have invented certain new and useful Improvements in Systems of Electrical Distribution, (Case No. 1,358,) of which the following is a specification.

In the operation of alternating-current systems, and more especially in the operation of those to which synchronous motors and rotary converters are connected, considerable difficulties arise, owing to fluctuations of frequency in the system. Systems embodying machines of the character specified are particularly subject to this difficulty, since the speed of these machines frequently surges backward and forward with considerable violence, this phenomenon being known in the art as "hunting." Where but one of these machines is used, the tendency to hunt is less than where a greater number are employed, since one machine, if it commences to hunt, transmits this tendency to other machines if present in the system, whereupon there is a surging backward and forward of current between the machines, the action of each machine magnifying or increasing the hunting of the other. Fluctuations in frequency are also often due to variations in angular velocity of the prime mover. Where such is the case, these periodic fluctuations in frequency often act to cause synchronous machines driven thereby to hunt in unison therewith or start them hunting with periods of their own.

To overcome the difficulties above mentioned and also others of a similar nature, I provide means for equalizing the frequency of an alternating-current system, thereby obtaining many advantages obvious to one skilled in the art. To this end I make use of an induction-machine of high inertia, the machine being so chosen that its inertia bears a fairly large ratio to the inertia of the machines connected to the alternating-current system. This induction-machine acts normally as a motor when the frequency of the system is constant. When the frequency varies, however, the machine acts as an induction-generator as the frequency drops and with greater torque as a motor as the frequency rises, thus in each case opposing the change in frequency.

The scope of my invention I have pointed out in the claims appended hereto and in the following description have set forth more in detail the nature and mode of application of my invention, reference being made by way of illustration to the accompanying drawing, showing it as applied to a distribution system.

At 1 I have indicated diagrammatically any suitable source of alternating current. Transmission-lines 2, 3, and 4 extend therefrom and serve to convey current to translating devices located at suitable points. The number and variety of translating devices fed from the source of current are not of particular importance so far as the application of my invention is concerned, although, as I have before stated, my invention becomes particularly useful in those cases where synchronous motors or rotary converters are supplied. I have therefore for purposes of illustration shown the system as supplying translating devices of this character, a rotary converter being shown at 5 and synchronous motors at 6 and 7. Lights L also are shown as receiving current through suitable step-down transformers.

The rotary converter 5 is shown as being supplied through a step-down transformer 8, fed from the mains 2, 3, and 4. Direct-current translating devices, such as motors M, are fed from the direct-current side of the converter; but it is of course to be understood that any other suitable translating devices may be employed in the same circuit. The details of the rotary-converter installation are unimportant, and they may be the same as those in ordinary use.

The synchronous motor 7 is indicated diagrammatically, its field being excited in the instance shown by means of a separate exciter 9, of any suitable form. As a typical illustration of a synchronous motor I have, on the contrary, shown the machine 6 in a form such as actually exists in practice. This machine is provided with a revolving field-magnet, which, for convenience, is excited from the direct-current mains of the rotary converter 5, conductors 10 and 11 being used in this case to indicate the connections between the field of the synchronous motor and the direct-current mains of the converter. It is obvious, however, that any other suitable source of direct current may be employed, if desired.

At 12 I have shown in side elevation a view of an induction-machine for equalizing the frequency on the mains 2 3 4 and its branches. This machine is connected by leads 13, 14, and 15 with the mains 2, 3, and 4 of the alternating-current system, this connection being made either directly, as shown, or, if desired, through the interposition of transforming devices. (Not shown, but of ordinary type.) This machine has preferably very low armature resistance, so as to have close speed regulation, while on the shaft of its rotating member is mounted a fly-wheel of comparatively large inertia. The close speed regulation of the machine renders it more sensitive in its action and causes it to respond more powerfully to small variations of frequency.

The fly-wheel has a tendency to cause the induction-machine to run at a uniform speed. When therefore fluctuations in frequency occur in the alternating-current system, the induction-machine does not respond to these fluctuations by adjusting its speed to correspond, but, on the contrary, has a tendency toward a uniform rate of rotation. The result is that when the frequency drops, due to hunting or other irregularities, the induction-machine is left running at a speed greater than that corresponding to the new value of frequency. The induction-machine then acts as a generator, and the kinetic energy of its rotating parts is returned to the system in the form of electrical energy, thus momentarily supplying additional driving power to the system and so opposing the drop in frequency. On the other hand, when the frequency rises momentarily the torque of the machine thus increases enormously, owing to the drag due to the inertia of the moving parts. The machine therefore acts as a powerful brake and tends to prevent such increase in frequency. It should be noted that in some cases where the frequency variations are very slight the induction-machine does not necessarily change from motor to generator and the reverse as the frequency varies, but alters its torque as a motor. It will thus be seen that the induction-machine acts to damp out any fluctuations or surging in the frequency of the supply system that may occur, this beneficial effect being obtained more particularly in cases where the inertia of the induction-machine or connected parts bears a fairly large ratio to the inertia of machines connected to the same system.

It is of course to be understood that the induction-machine may be caused to possess large inertia either inherently or by reason of mechanical connections with other apparatus possessing inertia—such, for example, as a belted connection with a separate fly-wheel or the like.

What I claim as new, and desire to secure by Letters Patent of the United States, is—

1. The combination with an alternating-current circuit, of an unloaded induction-machine of close speed regulation and high inertia, adapted to store and restore mechanical energy as the frequency of said circuit varies.

2. The combination with an alternating-current circuit, of an induction-machine of high inertia, adapted to act both as motor and as generator as the frequency in said circuit fluctuates.

3. The combination with an alternating-current circuit, of an induction-machine having a fly-wheel of large energy-storing capacity, whereby the machine acts as a generator or as a motor as the frequency of said circuit varies.

4. The combination with an alternating-current circuit, of an induction-machine having its rotating member connected to moving parts adapted by reason of high inertia to store and restore mechanical energy, whereby the induction-machine acts either as a motor or as a generator as the frequency of said circuit varies.

5. The combination of an alternating-current circuit, a synchronously-operating dynamo-electric machine connected thereto, and an asynchronous dynamo-electric machine also connected thereto and provided with a fly-wheel of large energy-storing capacity.

6. The combination of an alternating-current circuit, a synchronously-operating dynamo-electric machine connected thereto, and an asynchronous dynamo-electric machine also connected thereto and provided with a rotating member in mechanical relation to moving parts of high inertia.

In witness whereof I have hereunto set my hand this 7th day of March, 1900.

ERNST J. BERG.

Witnesses:
 BENJAMIN B. HULL,
 MABEL E. JACOBSON.